(12) United States Patent
Cesari et al.

(10) Patent No.: US 10,450,093 B2
(45) Date of Patent: Oct. 22, 2019

(54) DEVICE FOR ELECTRICAL CONNECTION, METHOD OF ASSEMBLING A FEMALE PART OF THIS CONNECTION DEVICE, SUPERINSULATING BLANKET AND SPACECRAFT

(71) Applicant: AIRBUS DEFENCE AND SPACE SAS, Les Mureaux (FR)

(72) Inventors: Philippe Cesari, Toulouse (FR); Jacques Cottier, Toulouse (FR); Vincent Claudet, Toulouse (FR)

(73) Assignee: AIRBUS DEFENCE AND SPACE SAS, Les Mureaux (FR)

( * ) Notice: Subject to any disclaimer, the term of this patent is extended or adjusted under 35 U.S.C. 154(b) by 150 days.

(21) Appl. No.: 15/743,223

(22) PCT Filed: Jul. 7, 2016

(86) PCT No.: PCT/FR2016/051737
§ 371 (c)(1),
(2) Date: Jan. 9, 2018

(87) PCT Pub. No.: WO2017/006064
PCT Pub. Date: Jan. 12, 2017

(65) Prior Publication Data
US 2018/0208333 A1    Jul. 26, 2018

(30) Foreign Application Priority Data

Jul. 9, 2015    (FR) ...................................... 15 01460

(51) Int. Cl.
*B64G 1/58* (2006.01)
*B64G 1/42* (2006.01)
(Continued)

(52) U.S. Cl.
CPC ............... *B64G 1/58* (2013.01); *B64G 1/428* (2013.01); *B64G 1/50* (2013.01); *H01R 13/04* (2013.01);
(Continued)

(58) Field of Classification Search
CPC . B64G 1/58; B64G 1/50; B64G 1/428; H01R 13/64; H01R 13/6277; H01R 13/18; H01R 13/04
See application file for complete search history.

(56) References Cited

FOREIGN PATENT DOCUMENTS

DE    102012223557 A1 *  6/2014  ............. H01R 13/18
DE    102012223557 A1     6/2014
(Continued)

OTHER PUBLICATIONS

European Patent Office (EPO) International Preliminary Report on Patentability issued in corresponding PCT Application No. PCT/FR2016/051737, dated Jan. 11, 2018.
(Continued)

*Primary Examiner* — Valentina Xavier
(74) *Attorney, Agent, or Firm* — Patzik, Frank & Samotny Ltd.

(57) ABSTRACT

A device for electrical connection intended to connect a super-insulating mattress to a structural panel of a spacecraft, said connection device comprising:
  a conducting sleeve having an axis extending in a first direction, said sleeve comprising a device for axial fastening of the insulating mattress and a support,
  a conductive pin suitable for being arranged in said sleeve,
  an elastic element carried by said support, said elastic element being suitable for exerting a force on the pin in a direction substantially perpendicular to the first direction in order to press the pin against the sleeve.

(Continued)

A method for assembling a female portion of a device for electrical connection to a super-insulating mattress, a super-insulating mattress and a spacecraft.

18 Claims, 4 Drawing Sheets

(51) Int. Cl.
*H01R 13/04* (2006.01)
*H01R 13/18* (2006.01)
*H01R 13/627* (2006.01)
*H01R 13/64* (2006.01)
*B64G 1/50* (2006.01)

(52) U.S. Cl.
CPC ......... *H01R 13/18* (2013.01); *H01R 13/6277* (2013.01); *H01R 13/64* (2013.01)

(56) References Cited

FOREIGN PATENT DOCUMENTS

| EP | 2530366 A1 | 5/2012 |
| FR | 2860349 A1 | 4/2005 |

OTHER PUBLICATIONS

English Machine Translation of German Publication No. DE 102012223557 (Gerundt et al.), Published Jun. 18, 2014.
English Machine Translation European Publication No. EP 2530366 (Charvet), Published May 12, 2012.
English Machine Translation French Publication No. FR2860349, (Jolly et al.) Published Apr. 1, 2005.
European Patent Office (EPO) International Search Report issued in corresponding PCT Application No. PCT/FR2016/051737, dated Jul. 7, 2016.

* cited by examiner

DEVICE FOR ELECTRICAL CONNECTION, METHOD OF ASSEMBLING A FEMALE PART OF THIS CONNECTION DEVICE, SUPERINSULATING BLANKET AND SPACECRAFT

FIELD AND BACKGROUND OF THE INVENTION

The present invention is in the field of spacecraft and in particular in artificial satellites. In these craft, all the objects must be connected to the ground in order to prevent electrostatic discharges. This grounding is generally carried out by connection to a structural panel of the satellite.

SUMMARY OF THE INVENTION

The present invention relates to a device for electrical connection, intended to connect a super-insulating mattress to a structural panel of a spacecraft, a super-insulating mattress, and a spacecraft.

The super-insulating mattresses generally called MLI (from "Multi-Layer Insulation") are, for example, used to thermally insulate a set of equipment operating in a range of temperatures from another set of equipment operating in another range of temperatures. These super-insulating mattresses are also used to thermally insulate a panel of the spacecraft against the effects of heating by the sun against the loss of heat via radiation on the space side. These super-insulating mattresses are composed of a sheet or of a stack of a plurality of thermally insulating and electrically conductive sheets and optionally of electrically non-conductive meshes interposed between the electrically conductive sheets. These meshes are used to promote thermal insulation via separation of the elements. This stack of sheets and optionally of meshes has a thickness of less than one millimeter. Conventionally, in order to ground the super-insulating mattress, the sheets are perforated and then fastened together using a rivet or a nut and bolt assembly. In order to ensure good electric contact between this rivet or the nut and bolt assembly and all the electrically conductive layers, a conductive material, for example such as metal washers, is interposed between these layers. An electric cable is assembled to the rivet simultaneously or later and fastened to an insert embedded in the structural panel of the satellite.

However, this assembly has numerous disadvantages. Indeed, during the creation of the satellite, it can be necessary to remove a super-insulating mattress, for example in order to replace a piece of equipment that did not perform satisfactorily during the tests, in order to carry out an additional check under the super-insulating mattresses or in order to add a new piece of equipment or a new function requested by the client. In these cases, the electric cable that connects the insert to the super-insulating mattress must be disconnected. This disconnection is complicated since the sheets of the super-insulating mattress are very fragile. They tear easily or deteriorate in such a way that the super-insulating mattress no longer really carries out its function of insulating.

Moreover, often, approximately ten electric cables are fastened to each insert and thus, during the reconnection of the electric cables to the insert, the operator can forget to reconnect a cable. In order to avoid such an oversight, all the electrical connections are tested after the final mounting of one or more super-insulating mattresses. This operation is long and complicated.

Finally, the positioning of the inserts with respect to the structural panels of the spacecraft, must be determined well upstream, during design, since, because of their small thickness, the structural panels cannot be perforated. They must be designed with the orifices for reception of the inserts. However, since the time it takes to build a satellite is becoming shorter and shorter and since client specifications change over time, it is difficult to foresee the positioning of the inserts in advance. To overcome this disadvantage, longer electric cables can be used to connect the insert of the panel to the rivet of the mattress. Nevertheless, these electric cables are costly and make the satellite heavier. Moreover, these cables pass under the neighboring mattresses, which makes their installation complicated.

The aim of the present invention is to propose a device for electrical connection that can be easily connected and disconnected without the risk of tearing or deteriorating the super-insulating mattress, and without being dependent on the presence or absence of the neighboring mattresses or on the preinstalled electric cables.

For this purpose, the object of the present invention is a device for electrical connection intended to connect a super-insulating mattress to a structural panel of a spacecraft, said connection device comprising:
  a sleeve having an axis A-A extending in a first direction z, said sleeve comprising a support extending in the first direction z,
  a conductive pin suitable for being arranged in said sleeve,
  an elastic element carried by said support, said elastic element being suitable for exerting a force on the pin in a direction substantially perpendicular to the first direction z,
wherein the support is conductive and the sleeve comprises a conductive fastening device suitable for axially fastening the super-insulating mattress, said fastening device comprising:
  a flange peripheral to the sleeve and extending in a plan perpendicular to the first direction z,
  a washer, the super-insulating mattress being intended to be interposed between the washer and the flange, and
  a stop established on the free end of the sleeve,
and in that said elastic element, made of metal, presses the pin against the sleeve.

Advantageously, this connection device is much lighter than the use of an electric cable.

According to particular embodiments, the connection device comprises one or more of the following features:
  The elastic element comprises a metal rod folded in such a way as to form a polygon having n sides, with n between 2 and 10, and preferably n equal to 5.
  The elastic element is open.
  The support has the shape of a truncated ring that extends over an angular sector of between 40° and 320°.
  Advantageously, the use of different shapes for the support and the elastic element ensures the existence of a point of contact between the two.
  The support comprises a groove in the shape of an arc of a circle and wherein the elastic element is arranged in said groove.
  Advantageously, said groove allows the axial fastening of the elastic element.
  The pin comprises a foot provided with a flat head.
  Advantageously, the flat head can be easily glued to the conductive structure and therefore be easily positioned at the necessary location on the structure of the satellite.

The length of the foot is between 1 and 2.5 times the length of the sleeve and wherein the device for electrical connection comprises a removable stop embedded in the free end of the foot.

Advantageously, the sleeve can slide along the pin. This possibility of movement allows a vertical clearance of the mattress with respect to a structural panel of the spacecraft. This vertical clearance facilitates the assembly and the disassembly of a mattress with respect to this structural panel. The elastic element and the difference in length between the pin and the sleeve ensure permanent electric contact between the sleeve and the pin while allowing axial mobility of the pin with respect to the sleeve, during the installation or during manipulations of the mattress.

Advantageously, the removable stop prevents the undesired removal of the sleeve on the pin that would otherwise cause undesired breaking of the electrical connection.

The free end of the foot is beveled or rounded.

Advantageously, this shape facilitates the insertion of the pin into the sleeve while progressively moving the elastic element away from its rest position.

The elastic element comprises a central rod segment, two intermediate rod segments, each, elbowed with respect to the central rod segment, and two end rod segments, each, elbowed with respect to an intermediate rod segment, and wherein the angles between the rod segments are obtuse angles, said angles being substantially identical, when the elastic element is not stressed.

The end rod segments are suitable for exerting, on the support, a force having a substantially radial direction and wherein the length of the end rod segments is greater than the length of the intermediate rod segments.

The device for axial fastening comprises a flange peripheral to the sleeve, extending in a plane perpendicular to the first direction and wherein the support comprises two flat faces extending in the same plane, said plane being substantially perpendicular to the plane of the flange, said flat faces being bearing faces for the elastic element, when the conductive pin is removed from said sleeve.

Advantageously, the central segment of the elastic element bears on the flat faces of the support, when the pin is not arranged in the sleeve.

The length of the central rod segment is substantially greater than the length defined between the ends of the flat faces of the support, and wherein the angle between the central rod segment and the intermediate rod segment is substantially identical to the angle defined between the flat faces of the support and the outer face of the support.

Thus, advantageously, the elastic element is fitted around the support with some clearance possible.

The device for axial fastening of the insulating mattress comprises a washer, a free end of the sleeve and the flange.

Advantageously, the super-insulating mattress is rigidly connected to the device for electrical connection and can thus be easily manipulated without being damaged.

The object of the invention is also a method for assembling a female portion of a device for electrical connection to a super-insulating mattress, said super-insulating mattress comprising from one to twenty-four conductive sheets; the male portion of the connection device comprising a pin fastened to a structural panel; the female portion of the device for electrical connection comprising:

a conductive sleeve having an axis extending in a first direction, said sleeve comprising a free end and an end provided with a peripheral flange and with a support extending in the first direction, a washer, an elastic element carried by said support, said elastic element being intended to exert a force on the pin in a direction substantially perpendicular to the axial direction in order to press the pin against the sleeve; said method comprising the following steps:

creating a through-hole in the conductive sheets of the super-insulating mattress;

fitting the sleeve into said through-holes in such a way as to press the conductive sheets against said flange;

positioning said washer on the conductive sheets;

establishing a stop on the free end of the sleeve, said stop being suitable for applying, to the conductive sheets, a force between 25 deca Newton and 60 deca Newton.

In particular, the step of establishing a stop comprises a step during which the free end of the sleeve is flared.

In particular, the step of establishing a stop comprises a step of clamping the free end of the sleeve.

Advantageously, the electrical connection between the conductive sheets and the sleeve is carried out solely by the flange, the washer and the outer surface of the sleeve. The pressure exerted in a calibrated manner ensures that the residual pressure exerted on the super-insulating mattress is sufficient and reproducible, thus guaranteeing the continuity of the electrical connection, without having to interpose electrically conductive elements.

The object of the invention is also an assembly of a super-insulating mattress, sleeve and elastic element, said super-insulating mattress being intended to be connected to a conductive pin fastened onto a structural panel of a spacecraft, said super-insulating mattress comprising:

conductive sheets each provided with at least one through-hole, a conductive sleeve arranged in the holes of the conductive sheets, said sleeve having an axis defining a first direction, said sleeve comprising a device for axial fastening of the conductive sheets and a support extending in the first direction, an elastic element carried by said support, said elastic element being intended to exert a force on the pin in a direction substantially perpendicular to the first direction in order to press the pin against the sleeve.

Finally, the object of the invention is also a spacecraft comprising:

a supporting structure carrying structural panels, at least one conductive pin comprising a foot and a flat head, said flat head being fastened via electrically conductive gluing to a structural panel and/or to the supporting structure;

at least one super-insulating mattress according to the claim mentioned above, said super-insulating mattress being removably fastened to at least said pin via insertion of the pin into said sleeve of the super-insulating mattress, the elastic element exerting a force on the pin in a direction substantially perpendicular to the first direction in order to press the pin against the sleeve.

BRIEF DESCRIPTION OF THE DRAWINGS

The invention will be better understood upon reading the following description, given only as an example and made in reference to the drawings in which.

DETAILED DESCRIPTION OF THE INVENTION

Figure 1:
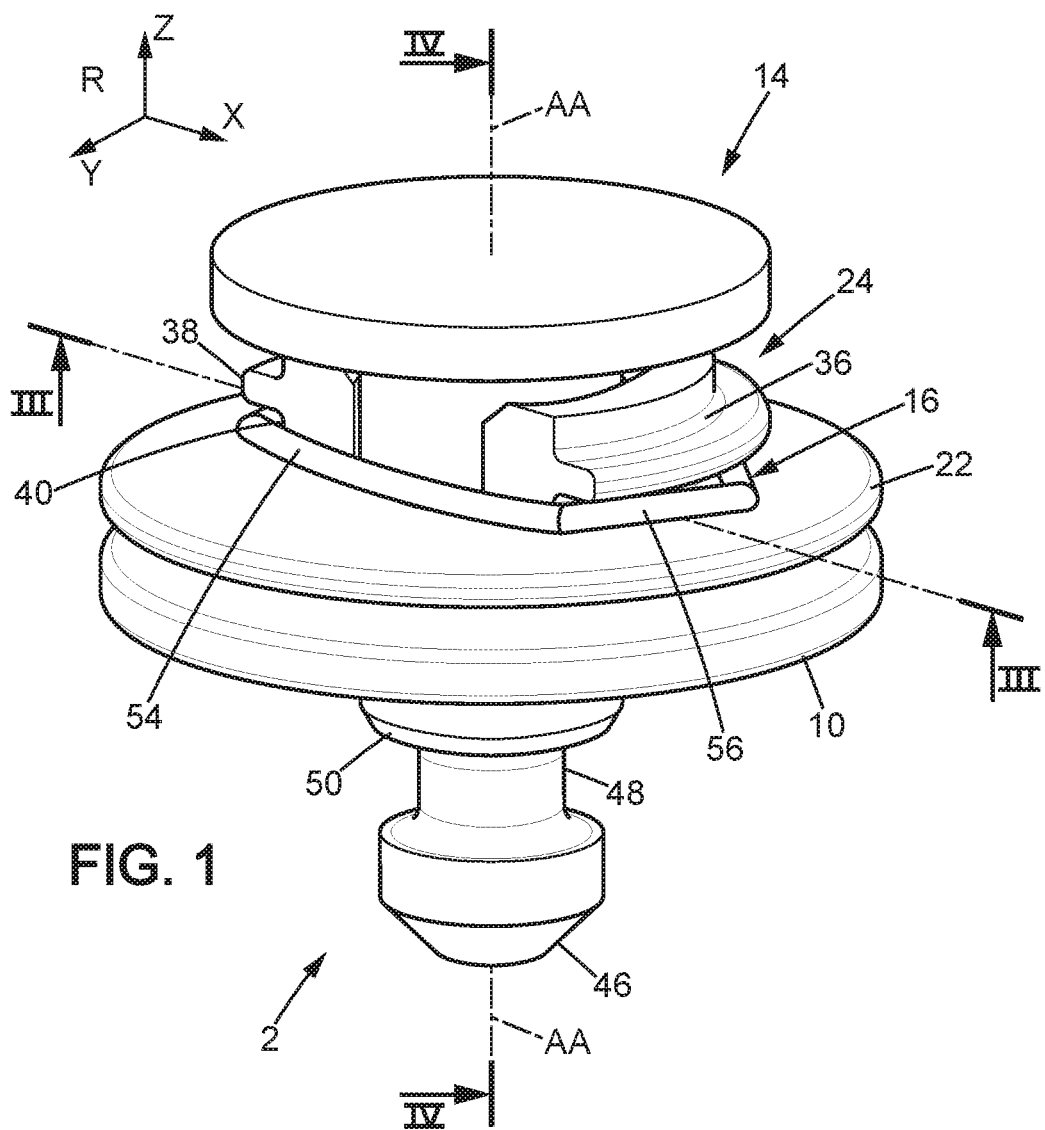
FIG. 1 is a perspective view of a connection device according to the present invention.

The present invention is defined with respect to an orthogonal reference frame R (x, y, z) shown in FIG. 1. By convention, in the following description, the direction z of the reference frame R (x, y, z) is called "first direction", the direction x of this reference frame is called "second direction", and the direction y of this reference frame is called "third direction". In the following description, the terms "top", "bottom", "lower" and "upper", are defined when the connection device according to the invention is positioned as illustrated in FIG. 1, and are in no way limiting.

The present invention relates to a connection device 2 suitable for electrically connecting the sheets 4 forming one or more super-insulating mattresses 6 to a structural panel 8. In the rest of the description, it will be considered that the connection device 2 is fastened to a single mattress 6. The goal of this arrangement is ease the understanding of the invention. It is in no way limiting.

Figure 2:
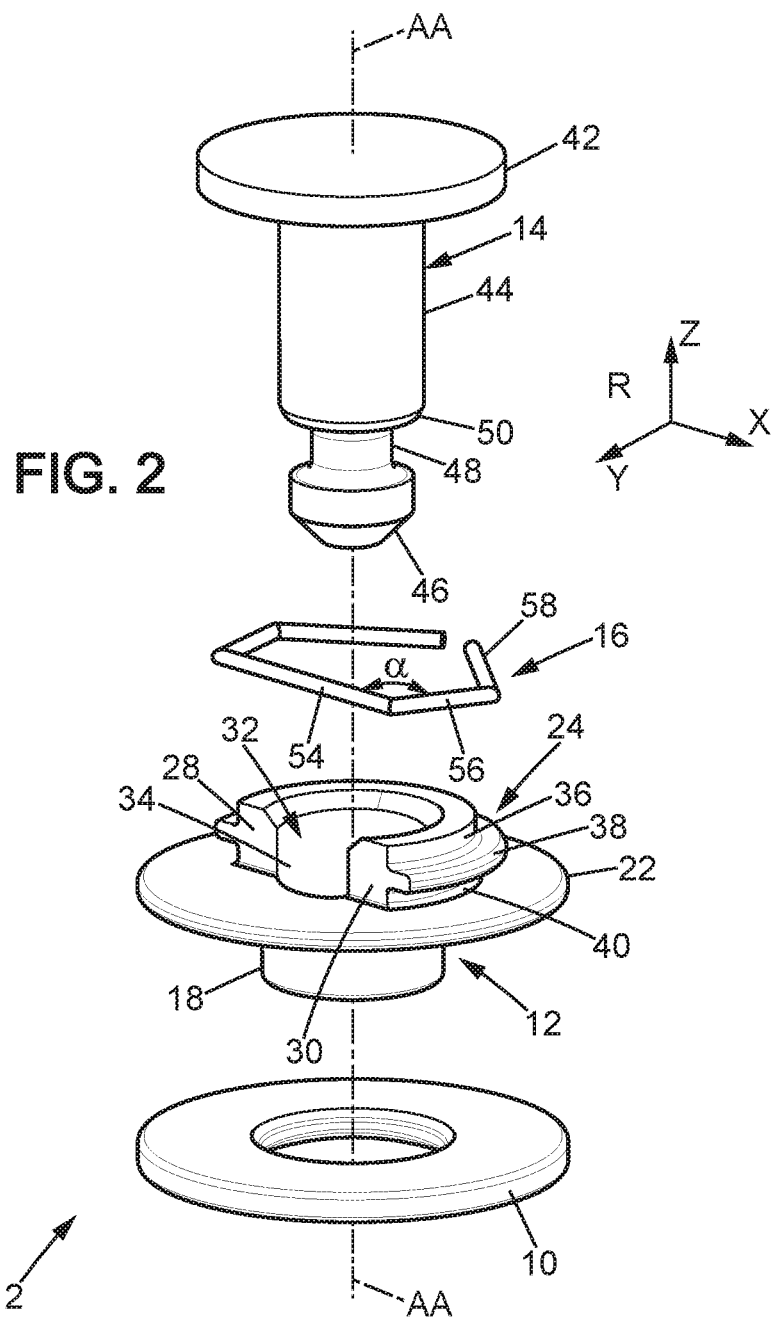
FIG. 2 is an exploded perspective view of the connection device illustrated in FIG. 1.
Figure 3:
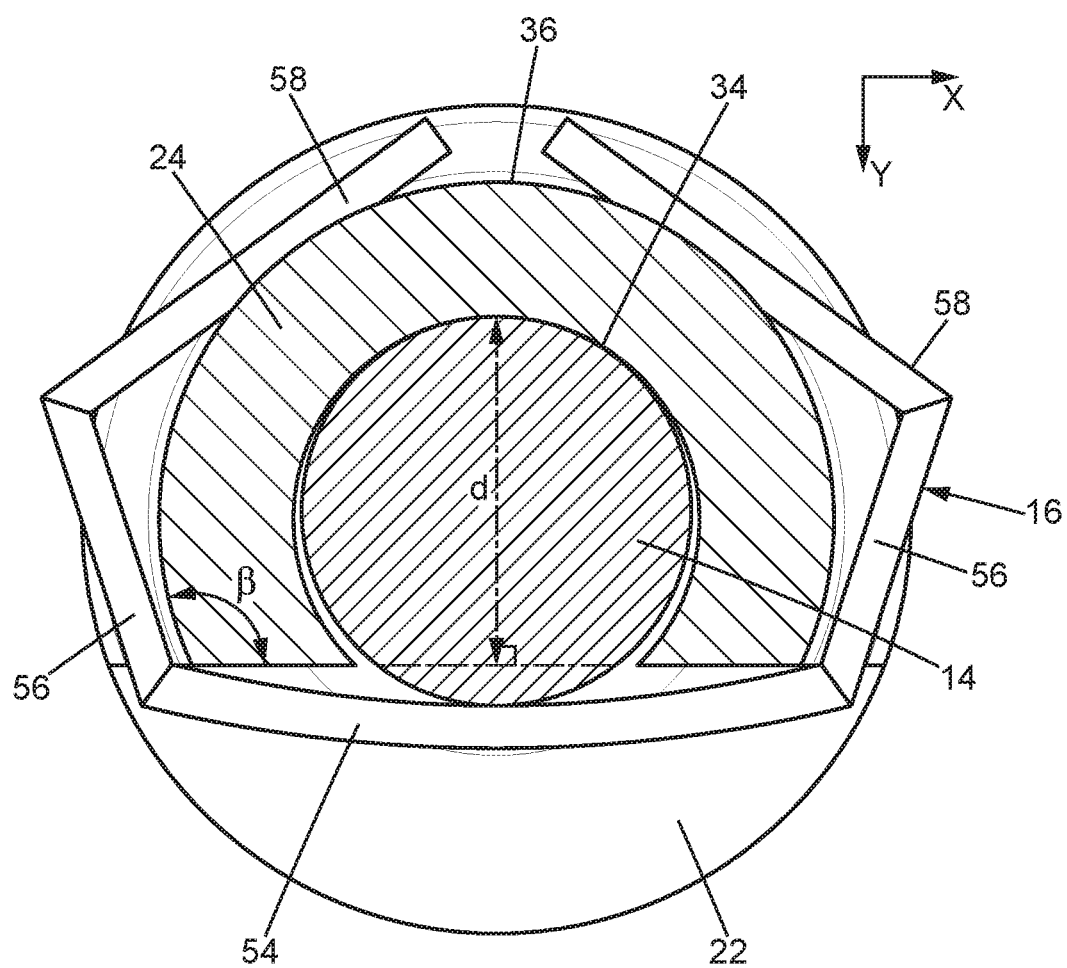
FIG. 3 is a cross-sectional view along the plane of the connection device illustrated in FIG. 1.
Figure 4:
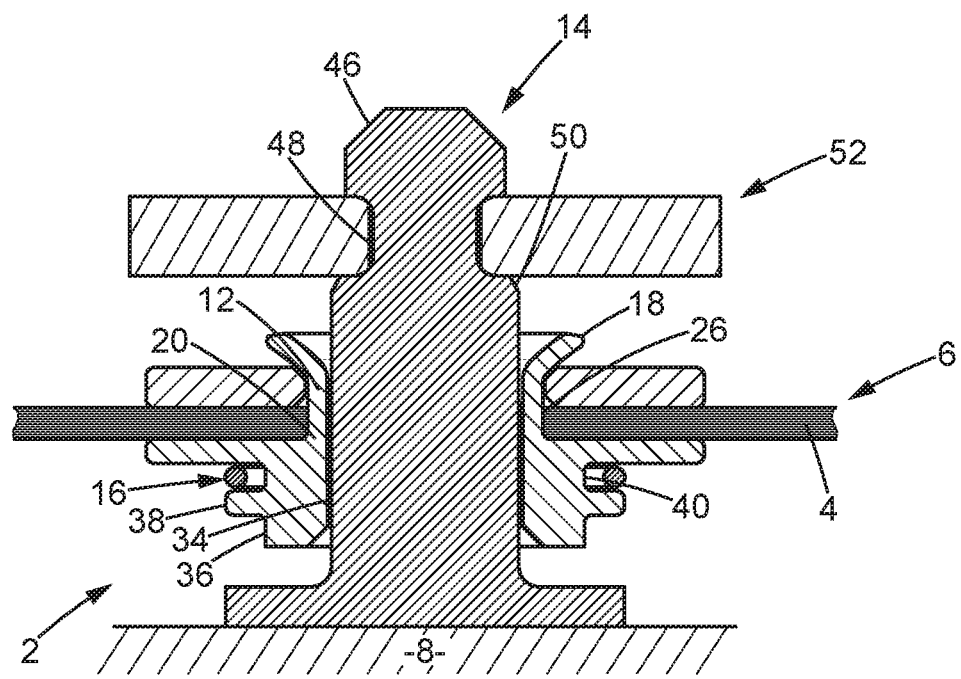
FIG. 4 is a cross-sectional view of a structural panel and of a super-insulating mattress fastened to the panel by the connection device illustrated in FIG. 1 and of a stop, the cutting plane being perpendicular to the plane of the super-insulating mattress.
Figure 5:
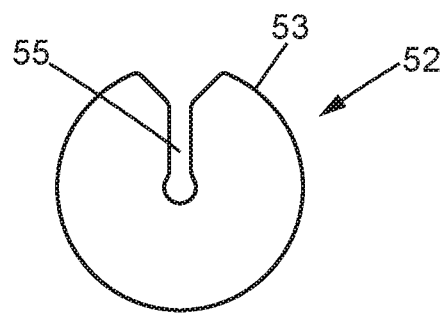
FIG. 5 is a front view of a stop.

In reference to FIGS. 1, 2 and 4, the connection device 2 according to the invention comprises a washer 10, a conductive sleeve 12, a conductive pin 14 suitable for being inserted and removed from the sleeve 12 during the connection and during the disconnection of the super-insulating mattress 6 to the structural panel 8, and an elastic element 16 suitable for pushing the pin 14 against the sleeve 12 in order to press it against the sleeve and ensure the electric contact between the two.

Preferably, the washer 10 is reversible.

In reference to FIG. 2, the sleeve 12 comprises, from bottom to top, a free end 18 and an end 20 provided with a peripheral flange 22 and with a support 24 positioned above the flange 22.

The sleeve 12 has an axis A-A that extends in the first direction z. The flange 22 is positioned in a plane (x, y) perpendicular to the first direction z.

As visible in FIG. 4, the sleeve 12 is intended to be inserted into through-holes 26 made in the sheets 4 of the mattress. These sheets 4 are thermally insulating and electrically conductive. Hereinafter, they will be called conductive sheets 4. When the connection device 2 is fastened to the mattress 6, the conductive sheets 4 of the super-insulating mattress are interposed between the washer 10 and the flange 22. The free end 18 of the sleeve is intended to form or receive a device for blocking/crushing the mattress. The flange 22, the washer 10 and the free end 18 of the sleeve form a device for axial fastening of the conductive sheets of the super-insulating mattress.

According to the preferred embodiment, the axis A-A of the sleeve 12 has central symmetry and a circular shape. However, according to other non-limiting embodiments, other shapes are possible for the sleeve 12, for example such as a square shape.

The support 24 extends in the first direction z. It has the shape of a truncated ring that extends in the plane (x, y) over an angular sector of between 40° and 320°. This ring has an axis that is substantially the same as the axis A-A of the sleeve 12.

The cutting plane (x, z) of the truncated ring extends substantially perpendicularly to the plane in which the flange 22 is contained. It is positioned at a distance d defined in such a way as to generate two cutting planes and an opening 32 for passage of the pin, positioned between the two cutting planes. The two cutting planes form flat bearing faces 28, 30 for the elastic element. These two flat faces 28, 30 extend in the same plane that is the cutting plane.

The distance d is the maximum distance between a point on the inner face 34 of the sleeve and its orthogonal projection onto the cutting plane (x, z). This distance d is less than the diameter of the pin 14.

When the pin 14 is not arranged in the sleeve 12, the elastic element 16 bears against the flat faces 28, 30 of the support. When the pin 14 is arranged in the sleeve 12, a portion of the pin protrudes out of the support 24, via the passage opening 32. The elastic element 16 thus bears on the pin 14 and exerts a force on the latter that is substantially perpendicular to the axis of the sleeve 12.

The outer face 36 of the support is provided with a bead 38 in the shape of an arc of a circle. This bead 38 defines, together with the flange 22, a groove 40 for receiving the elastic element 16. This groove 40 extends over an arc of a circle.

The conductive pin 14 comprises a head 42 and a foot 44.

The head 42 is preferably flat and smooth. It is suitable for being glued to the structural panel 8, using an electrically conductive glue.

Advantageously, this electrically conductive gluing can be carried out later in the production of the satellite because the location of the gluing does not need to be defined during the design of the structural panels of the satellite. Moreover, in the case of incorrect positioning of the pin, another pin can easily be glued at another location.

The foot 44 has a length between 1 and 2.5 times the length of the sleeve 12 in the first direction z in such a way that the sleeve can slide axially with respect to the pin in order to allow a slight movement of the super-insulating mattress 6 with respect to the structural panel 8.

The foot 44 comprises from bottom to top, a first entry bevel 46, a circular groove 48 and a second entre bevel 50.

The first 46 and second 50 entry bevels facilitate the insertion of the pin 14 into the sleeve 12, when the elastic element 16 is mounted on the support.

Advantageously, the circular groove 48 is suitable for receiving a stop 52 for stopping the sleeve.

This stop is removable. It is suitable for blocking involuntary removal of the pin 14 with respect to the sleeve 12. The thickness of the stop must be adapted in order to ensure that there is always at least one contact between the elastic element and the pin, including when taking into account the reversibility of the sleeve 12. Thus, the thickness of the stop must be sufficient to maintain the spring under the lower limit of the second entry bevel 50.

As a non-limiting example, the stop comprises a disc 53 having a radial slit 55.

Preferably, the stop is reversible.

The elastic element 16 is, for example, formed by a rod. This rod is made of metal and preferably of steel. It has, for example, a diameter of less than one millimeter.

According to the embodiment shown in the drawings, this rod 16 is folded into the shape of an open pentagon.

Thus, in the embodiment of the invention shown, the elastic element 16 comprises a central rod segment 54, two intermediate rod segments 56, each elbowed with respect to the central rod segment 54, and two end rod segments 58, each elbowed with respect to the intermediate rod segment 56 that is adjacent to it.

The central rod segment 54 is suitable for exerting a force substantially perpendicular to the first direction z in order to press the pin 14 against the sleeve 12.

The end rod segments 58 are suitable for exerting, on the support 24, a force having a substantially radial direction when the pin 14 is arranged in the sleeve 12. For this purpose, the length of the end rod segments 58 is preferably greater than the length of the intermediate rod segments 56.

The shape and the material of the elastic element 16, as well as the dimensions of the pin 14 and of the sleeve 12, are chosen in such a way that the stress exerted by the pin 14 on the elastic element 16 is less than the elastic limit of the elastic element in such a way as to ensure reliable and lasting electric contact between the sleeve 12, the pin 14 and the elastic element 16.

Advantageously, the joined shapes of the elastic element 16 and of the support 24 create four simultaneous and permanent mechanical and electric contacts: two electric contacts between the elastic element 16 and the support 24, a contact between the elastic element 16 and the pin 14, and a contact between the pin 14 and the sleeve 12.

In the embodiment shown and in a way that is not at all limiting, the elastic element is fitted around the support 24. Thus, the length of the central rod segment 54 is substantially greater than the length defined between the ends of the flat faces 28, 30 of the support and the angle α between the central rod segment 54 and the intermediate rod segment 56 is substantially identical to the angle β defined between the flat faces 28, 30 of the support and the outer face 36 of the support.

In the embodiment shown, the angles α defined between the rod segments 54, 56, 58 are obtuse angles. These angles α are substantially identical, when the elastic element 16 is not stressed.

Alternatively, the elastic element consists of a flat lug.

Alternatively, the elastic element is in the shape of a polygon having n sides with n between 2 and 10.

Alternatively, the elastic element is in the shape of a U or of an open or closed circle.

Alternatively, the end of the foot is rounded.

Alternatively, the device for axial fastening can be replaced by a screw thread made at the free end of the sleeve and by the use of a nut.

Alternatively, the support comprises at least one flat or curved wall onto which the elastic element is attached in order to push the pin against the inner wall of the sleeve.

According to an alternative that is not shown, the joined shapes of the elastic element and of the support generate at least three simultaneous and permanent mechanical and electric contacts: at least one electric contact between the elastic element 16 and the support 24, at least one contact between the elastic element 16 and the pin 14, and at least one contact between the pin 14 and the sleeve 12. According to the shape of the elastic element and its positioning on the sleeve 12, additional contacts are possible, beyond these three minimum contacts.

Moreover, in order to ensure the electric contact between the electrically conductive sheets and the non-conductive meshes of the super-insulating mattress, the orifices of the meshes have a diameter greater than the diameter of the sleeve and washers are placed in the sleeve, each interposed between two adjacent conductive sheets. These washers provide the electric conductivity between the sleeve and the electrically conductive sheets.

These washers, however, are installed manually. This installation is long and costly.

The second goal of the present invention is to reduce the time and the cost of mounting the sleeve onto the super-insulating mattress.

For this purpose, the present invention proposes a method for mounting an assembly element onto a super-insulating mattress.

This method can be used to assemble from one to twenty-four conductive sheets 4. This method allows the mechanical assembly of and the simultaneous creation of an electrical connection between the conductive sheets and a hollow rivet or a female portion of the device for electrical connection according to the present invention. In the latter case, the female portion of the connection device comprises the washer, the sleeve and the elastic element and the male portion comprises the conductive pin.

This assembly method comprises the following steps:
creating a through-hole 26 in the conductive sheets 4 of the super-insulating mattress 6;
fitting the sleeve 12 of the device for electrical connection 2 or any other rivet into said through-holes 26 in such a way as to press the conductive sheets 4 against said flange 22;
positioning said washer 10 on the conductive sheets 4;
establishing a stop on the free end 18 of the sleeve 12, said stop being suitable for applying, onto the conductive sheets, a force between 20 deca Newton and 60 deca Newton.

Advantageously, this force ensures the permanent and definitive electrical connection between the conductive sheets, the sleeve, the flange and the washer without requiring the use of washers interspaced between the conductive sheets or of gluing of an intermediate adhesive.

Preferably, the diameter of the through-hole 26 is substantially equal to the outer diameter of the sleeve. Thus, the through-holes are fitted against the sleeve in such a way as to ensure electrical contact between the edges of the conductive sheets and the outer face of the sleeve.

According to an embodiment of this method, the stop is established by the stamping of the free end 18 of the sleeve 12. This stamping is obtained by applying a pressure between 250 deca Newton and 600 deca Newton using a suitable tool.

According to another alternative, the stop is established by threading the free end of the sleeve 12 and by screwing a clamping screw therein. The clamping capable of being carried out manually or automatically using a machine.

Alternatively, the assembly method according to the invention can also be used with a simple hollow rivet.

Any tool allowing a calibrated residual pressure, sufficient to ensure reproducible electric contact, to be applied onto the super-insulating mattress can be used.

This method is independent of the device for electrical connection described above. The applicant reserves the right to file a patent application solely with respect to the latter.

The invention also relates to an assembly of a super-insulating mattress, sleeve and elastic element. Said super-insulating mattress 6 is intended to be connected to the conductive pin 14 fastened onto a structural panel 8 of a spacecraft. The super-insulating mattress 6 comprising conductive sheets 4 each provided with at least one through-hole 26. The conductive sleeve 12 being arranged in the holes 26 of the conductive sheets. The sleeve 12 has an axis A-A defining a first direction z. The sleeve 12 comprises a device for axial fastening 10, 18, 22 of the conductive sheets and a support 24 extending in the first direction z. The elastic element 16 is carried by the support 24. The elastic element 16 is intended to exert a force on the pin 14 in a direction substantially perpendicular to the first direction z in order to press the pin 14 against the sleeve 12.

The invention also relates to a spacecraft comprising:

a supporting structure carrying structural panels 8, at least one conductive pin 14 comprising a foot 44 and a flat head 42, said flat head 42 being fastened via electrically conductive gluing to a structural panel 8 and/or to the supporting structure;

at least one assembly of a super-insulating mattress, sleeve and elastic element according to the features mentioned above. The super-insulating mattress 6 is removably fastened to at least said pin 14 via insertion of the pin into said sleeve 12 of the super-insulating mattress 6. The elastic element 16 exerts a force on the pin 14 in a direction substantially perpendicular to the first direction z in order to press the pin 14 against the sleeve 12.

The invention claimed is:

1. A device for electrical connection intended to connect a super-insulating mattress to a structural panel of a spacecraft, said connection device comprising:

a sleeve having an axis extending in a first direction, said sleeve comprising a support extending in the first direction, a conductive pin suitable for being arranged in said sleeve, an elastic element carried by said support, said elastic element being suitable for exerting a force on the pin in a direction substantially perpendicular to the first direction characterized in that the support is conductive and the sleeve comprises a conductive fastening device suitable for axially fastening the super-insulating mattress, said fastening device comprising:

a flange peripheral to the sleeve and extending in a plan perpendicular to the first direction, a washer, the super-insulating mattress being intended to be interposed between the washer and the flange, and a stop established on the free end of the sleeve, and in that said elastic element, made of metal, presses the pin against the sleeve.

2. The device for electrical connection according to claim 1, wherein the elastic element comprises a metal rod folded in such a way as to form a polygon having n sides, with n between 2 and 10.

3. The device for electrical connection according to claim 1, wherein the elastic element is open.

4. The device for electrical connection according to claim 1, wherein the support has the shape of a truncated ring that extends over an angular sector of between 40° and 320°.

5. The device for electrical connection according to claim 1, wherein the support comprises a groove in the shape of an arc of a circle and wherein the elastic element is arranged in said groove.

6. The device for electrical connection according to claim 1, wherein the pin comprises a foot provided with a flat head.

7. The device for electrical connection according to claim 6, wherein the length of the foot is between 1 and 2.5 times the length of the sleeve and wherein the device for electrical connection comprises a removable stop embedded in the free end of the foot.

8. The device for electrical connection according to claim 6, wherein the free end of the foot is beveled or rounded.

9. The device for electrical connection according to claim 1, wherein the elastic element comprises a central rod segment—two intermediate rod segments, each elbowed with respect to the central rod segment, and two end rod segments, each elbowed with respect to an intermediate rod segment, and wherein the angles between the rod segments are-obtuse angles, said angles being substantially identical, when the elastic element is not stressed.

10. The device for electrical connection according to claim 9, wherein the end rod segments are suitable for exerting, on the support, a force having a substantially radial direction and wherein the length of the end rod segments is greater than the length of the intermediate rod segments.

11. The device for electrical connection according to claim 4, wherein the support comprises two flat faces extending in the same plane, said plane being substantially perpendicular to the plane of the flange, said flat faces being bearing faces for the elastic element, when the conductive pin is removed from said sleeve.

12. The device for electrical connection according to claim 11, wherein the elastic element comprises a central rod segment, two intermediate rod segments, each elbowed with respect to the central rod segment, and two end rod segments, each elbowed with respect to an intermediate rod segment, wherein the angles between the rod segments are obtuse angles, said angles being substantially identical, when the elastic element is not stressed, wherein the length of the central rod segment is substantially greater than the length defined between the ends of the flat faces of the support, and wherein the angle between the central rod segment and the intermediate rod segment is substantially identical to the angle defined between the flat faces of the support and the outer face of the support.

13. A method for assembling a female portion of a device for electrical connection to a super-insulating mattress, said super-insulating mattress comprising from one to twenty-four conductive sheets; the female portion of the device for electrical connection comprising:

a conductive sleeve having an axis extending in a first direction, said sleeve comprising a free end and an end provided with a peripheral flange, and a support extending in the first direction, a washer, an elastic element carried by said support, said elastic element being intended to exert a force on the pin in a direction substantially perpendicular to the axial direction in order to press the pin against the sleeve; said method comprising the following steps:

creating a through-hole in the conductive sheets of the super-insulating mattress;

fitting the sleeve into said through-holes in such a way as to press the conductive sheets against said flange;

positioning said washer on the conductive sheets;

establishing a stop on the free end of the sleeve, said stop being suitable for applying, onto the conductive sheets, a force between 25 deca Newton and 60 deca Newton.

14. The assembly method according to claim 13, wherein the step of establishing a stop comprises a step during which the free end of the sleeve is flared.

15. The assembly method according to claim 13, wherein the step of establishing a stop comprises a step of clamping the free end of the sleeve.

16. An assembly of a super-insulating mattress and device for electrical connection, said device for electrical connection being according to claim 1, said super-insulating mattress comprising conductive sheets each provided with at least one through-hole, said conductive sleeve being arranged in the through holes of the conductive sheets, said conductive sheets being interposed between the washer and the flange, said super-insulating mattress being connected to the conductive pin, said conductive pin being intended to be fastened onto a structural panel of a spacecraft.

17. A spacecraft comprising:
a supporting structure carrying structural panels,
a device for electrical connection according to claim 1,
said at least one conductive pin comprising a foot and a flat head, said flat head being fastened via electrically conductive gluing to a structural panel and/or to the supporting structure; and
at least super-insulating mattress, said super-insulating mattress being removably fastened to said at least one said pin via insertion of the pin into said sleeve.

18. The device for electrical connection according to claim 2, wherein n is equal to 5.

\* \* \* \* \*